United States Patent
Hebbalaguppe et al.

(10) Patent No.: US 11,126,835 B2
(45) Date of Patent: Sep. 21, 2021

(54) HAND DETECTION IN FIRST PERSON VIEW

(71) Applicant: Tata Consultancy Services Limited, Mumbai (IN)

(72) Inventors: Ramya Sugnana Murthy Hebbalaguppe, Gurgaon (IN); Jitender Kumar Maurya, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 106 days.

(21) Appl. No.: 16/796,514

(22) Filed: Feb. 20, 2020

(65) Prior Publication Data

US 2020/0272813 A1    Aug. 27, 2020

(30) Foreign Application Priority Data

Feb. 21, 2019    (IN) .............................. 201921006896

(51) Int. Cl.
| | | |
|---|---|---|
| *G06K 9/20* | (2006.01) | |
| *G06K 9/62* | (2006.01) | |
| *G06N 3/04* | (2006.01) | |
| *G06N 3/08* | (2006.01) | |

(Continued)

(52) U.S. Cl.
CPC ....... *G06K 9/00375* (2013.01); *G06K 9/2054* (2013.01); *G06K 9/4652* (2013.01); *G06K 9/6265* (2013.01); *G06N 3/0472* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2017/0371403 | A1* | 12/2017 | Wetzler | ..................... G06K 9/78 |
| 2018/0137642 | A1 | 5/2018 | Malisiewicz et al. | |
| 2019/0246036 | A1* | 8/2019 | Wu | ......................... B60R 11/04 |

OTHER PUBLICATIONS

Singh, S. et al. "First Person Action Recognition Using Deep Learned Descriptors," *2016 IEEE Conference on Computer Vision and Pattern Recognition (CVPR)*, Jun. 27-30, 2016, Las Vegas, Nevada; pp. 2620-2628.

(Continued)

*Primary Examiner* — Idowu O Osifade
(74) *Attorney, Agent, or Firm* — Finnegan, Henderson, Farabow, Garrett & Dunner LLP

(57) ABSTRACT

A system and a method for verification of a source code are provided. There as many techniques available that can be used for verification of software codes, however, it is difficult to determine appropriate technique that can be utilized for verification of a given software code. In an embodiment, the system receives a source code encoded with one or more specifications to be verified. A static analysis of the source code is performed to identify program features of the source code. The program features may include, but are not limited to, multiple return paths, loops with an unstructured control flow, loops with arrays, short ranges and numerical loops. Based on the identification of the program features, verification techniques are applied to the source code for the verification. Each verification technique of the one or more verification techniques is applied for a predetermined period of time and in a predefined order.

15 Claims, 6 Drawing Sheets

(51) Int. Cl.
   *G06K 9/00* (2006.01)
   *G06K 9/46* (2006.01)

(56) References Cited

OTHER PUBLICATIONS

Le, T.H.N. et al. "Robust Hand Detection and Classification in Vehicles and in the Wild," *2017 IEEE Conference on Computer Vision and Pattern Recognition Workshops (CVPRW)*, Jul. 21-26, 2017, Honolulu, Hawaii; pp. 39-46.
Bertasius, G. et al. (Jul. 2017). "First-Person Action-Object Detection with EgoNet," *Robotics: Science and Systems 2017*; 10 pages.

* cited by examiner

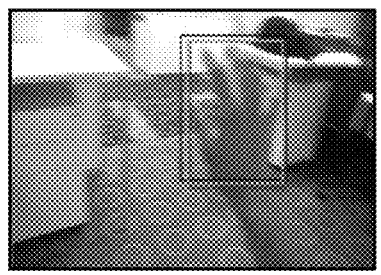
FIG. 6A  FIG. 6B
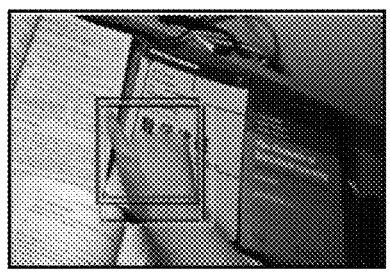
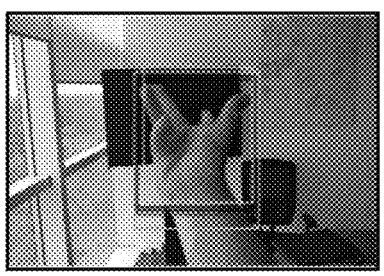
FIG. 6C  FIG. 6D
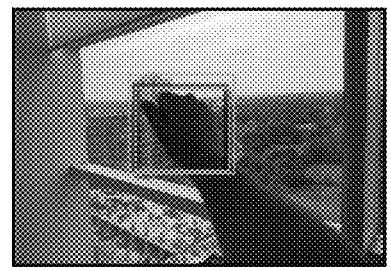
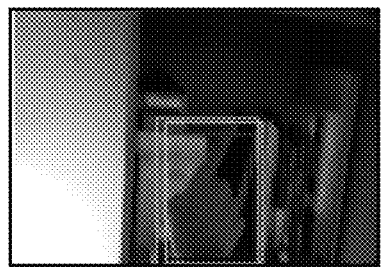
FIG. 6E  FIG. 6F
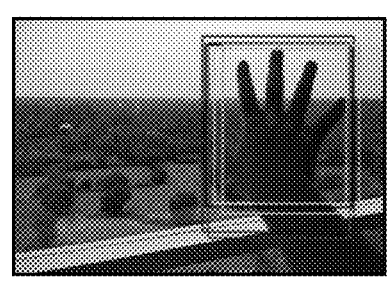
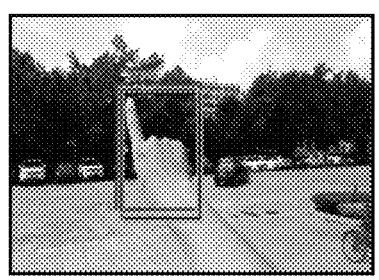
FIG. 6G  FIG. 6H
········· 1
▬▬▬ 2
▬▬▬ 3
▬▬▬ 4
▬▬▬ 5

HAND DETECTION IN FIRST PERSON VIEW

PRIORITY CLAIM

This U.S. patent application claims priority under 35 U.S.C. § 119 to: India Application No. 201921006896, filed on Feb. 21, 2019. The entire contents of the aforementioned application are incorporated herein by reference.

TECHNICAL FIELD

The disclosure herein generally relates to hand detection, and, more particularly, to system and method for real-time hand detection in first person view (FPV) using convolutional neural network (CNN).

BACKGROUND

With pervasive wearable technology and introduction of head mounted devices, hand gestures play an important role for interaction. Applications for hand detection are wide, in the fields of robotics, Augmented and Virtual Reality (AR/VR), Grab-and-go grocery stores amongst others. Typically, hand detection is the first step in said aforementioned applications.

Conventionally, hand detection can be achieved through the state-of-the-art deep learning models including, but not limited to, YOLOv2, MobileNetv2 and Faster R-CNN. Often, such models are computationally expensive or fail to achieve real-time performance in a resource constrained environments such as frugal video see-through Head Mounted Devices (HMD).

SUMMARY

Embodiments of the present disclosure present technological improvements as solutions to one or more of the above-mentioned technical problems recognized by the inventors in conventional systems.

For example, in one embodiment, a processor implemented method for real-time hand detection in a first person view (FPV) is provided. The method includes receiving a RGB image of a scene captured in the first person view (FPV) as an input by a CNN network, via one or more hardware processors. The CNN network comprising eleven learned layers comprising nine convolutional layers followed by two fully connected layers. Further the method includes extracting image features from the RGB image by the nine convolutional layers of the CNN network, via the one or more hardware processors. Also, the method includes predicting, based on the image features, a probability of detection of the hand, a normalized centroid of the hand and normalized dimensions of a bounding box corresponding to the hand in the RGB image via the one or more hardware processors, by the fully connected layer of the CNN network. Herein the CNN network is pre-trained based on a loss function, and the loss function is indicative of level of training of the CNN network. Also, the loss function includes a loss of probability of detection of the hand, a loss of the centroid of the bounding box and a loss of the bounding box dimensions.

In another embodiment, a system for real-time hand detection in a FPV is provided. The system includes a memory storing instructions; one or more communication interfaces; and one or more hardware processors coupled to the memory via the one or more communication interfaces, wherein the one or more hardware processors are configured by the instructions to receive a RGB image of a scene captured in the FPV as an input by a CNN network. The CNN network comprising eleven learned layers comprising nine convolutional layers followed by two fully connected layers. Further the one or more hardware processors are configured by the instructions to extract image features from the RGB image by the nine convolutional layers of the CNN network. Also, the one or more hardware processors are configured by the instructions to predict, based on the image features, a probability of detection of the hand, via the one or more hardware processors, a normalized centroid of the hand and normalized dimensions of a bounding box corresponding to the hand in the RGB image, by the fully connected layer of the CNN network. Herein, the CNN network is pre-trained based on a loss function, and the loss function is indicative of level of training of the CNN network. Also, the loss function includes a loss of probability of detection of the hand, a loss of the centroid of the bounding box and a loss of the bounding box dimensions.

In yet another embodiment, one or more non-transitory machine readable information storage mediums are provided. Said one or more non-transitory machine readable information storage mediums comprises one or more instructions which when executed by one or more hardware processors causes receiving a RGB image of a scene captured in the FPV as an input by a CNN network. The CNN network comprising eleven learned layers comprising nine convolutional layers followed by two fully connected layers. Further, the one or more non-transitory machine readable information storage mediums comprises one or more instructions which when executed by one or more hardware processors causes extracting image features from the RGB image by the nine convolutional layers of the CNN network, via the one or more hardware processors. Furthermore the one or more non-transitory machine readable information storage mediums comprises one or more instructions which when executed by one or more hardware processors causes predicting, based on the image features, a probability of detection of the hand, via the one or more hardware processors, a normalized centroid of the hand and normalized dimensions of a bounding box corresponding to the hand in the RGB image, by the fully connected layer of the CNN network. Herein the CNN network is pre-trained based on a loss function, and the loss function is indicative of level of training of the CNN network. Also, the loss function includes a loss of probability of detection of the hand, a loss of the centroid of the bounding box and a loss of the bounding box dimensions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A-6H illustrate detection of bounding box in various example images of a hand as detected by the disclosed CNN network (of FIG. 3) vis-à-vis conventional networks, in accordance with some embodiments of the present disclosure.

DETAILED DESCRIPTION

Figure 1:
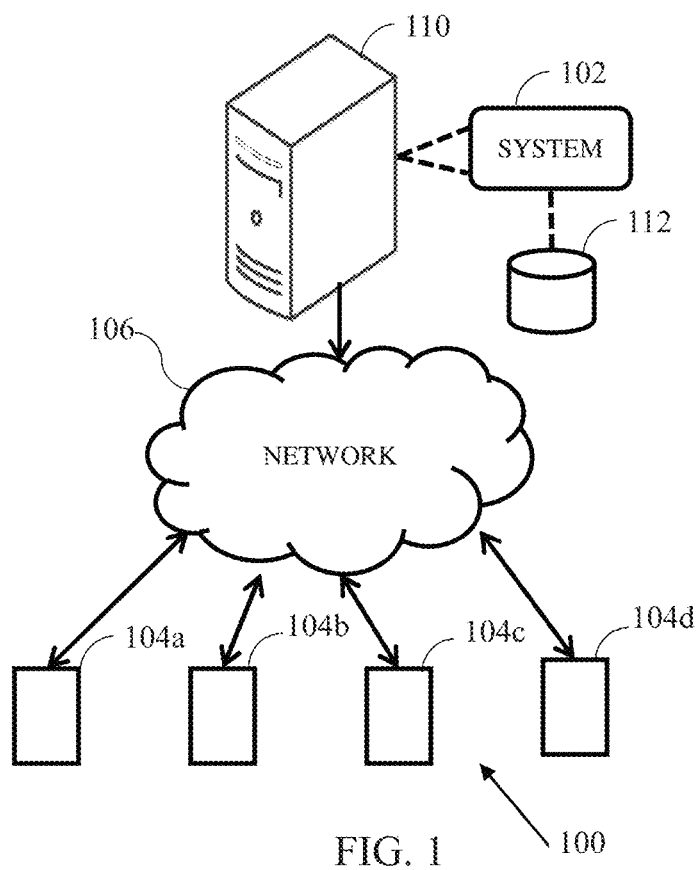
FIG. 1 illustrates network environment implementing a system 102 for real-time hand detection in FPV, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With the transition to head mounted devices such as Microsoft Hololens™ Google Glass™, Google Cardboard™, GoPro™, and Narrative Clip™ has made egocentric research in computer vision a rapidly growing area. A large body of work in egocentric vision is primarily concentrated on action and hand recognition. Real-time hand detection in first-person view (FPV) for hand keypoint detection, gesture interpretation and Human computer interfaces (HCI) has not been explored much. For many applications in this domain, it is necessary to accurately detect hand for gestural interaction in First Person View (FPV).

Despite having robust deep learning models to solve aforementioned problems using start-of-the-art hand detectors and sequence tracking methodologies, obtaining real-time performance on a low computational intensive device without compromising accuracy is a challenge. Most sophisticated Augmented Reality (AR) headsets commercially available, like Hololens™, Dagri™ are exorbitantly priced and the gestural interpretation is done via multiple cameras or with the help of depth data. Expensive headsets limit the mass market reach. Among the most popular and frugal head mounts, Google Cardboard™ and Wearality™ are video-see-through devices that can provide immersible AR and VR experiences with a smartphone.

Previous work in first-person action recognition found that daily actions are well explained by looking at hands. In these approaches, hand information is important although this has not yet studied in greater detail. A setback for hand keypoint detection for action recognition and air-writing is the absence of robust lightweight hand detection module that is available off-the-shelf and a hand detector that works in wild on RGB stream. This is in contrast to state-of-art multiple hand detectors in real data sequences such as Faster R-CNN, YOLOv2 and so on. A low computation method that can localize hand in RGB images, a module that does not require depth would enable new applications in HCI and robotics. The disclosed system that enables real-time hand detection that could be used for various purposes such as hand key point detection, air-writing, gesture interpretation and many more related applications.

Gestures are a natural form of human communication, when accompanied with speech, gestures convey information about the intentions, interests, feelings and ideas of the speaker. Gestures are even more important in noisy environments, at a distance, and for people with hearing impairment. In-air gestures form a dominant mode of input for HCI and they are usually preferred over touch based system. In these scenarios, gestures replace speech as the primary means of communication, becoming both more common and more structured mode of interaction.

Typically, hand detection for example, hand detection and segmentation are momentous in FPV gesture recognition applications. In one application it was observed the YCbCr color space allows better clustering of hand skin pixel data. However, this method is color and lighting dependent which limits its suitability. Another conventional method uses touchless hand gesture based region marking through wearables for tele-support applications for hand detection. It involves point gesture detection, which is followed by tracking the point gesture until loop closure occurs. Further, another conventional method facilitates identifying hands on a smartphone with an accuracy around 88%; 92% respectively using Y CbCr filters, however it is not sufficient to have a seamless real-time interaction with HMD owing to slightly less accurate hand detection. Yet another conventional technique employs the Gaussian Mixture Models (GMM) based on human skin pixels, which was later extended for accurate hand swipe classification. However, for user interfaces hand detection needs to be seamless with very high accuracy. Still another conventional technique utilizes croma channel for capturing the spatial characteristic of skin tone. A conventional system was presented for hand detection and gesture recognition via bare hand detection in the cluttered background using skin detection followed by bag-of-features and multi-class Support Vector Machines (SVM). Another system utilizes color analysis with a Random Forest in skin segmentation. In another conventional system, superpixels with several features are extracted using SLIC algorithm for computing hand segmentation masks. Yet another conventional system analyses the response of Gabor filters to examine local appearance features in skin color regions. Despite the usability of the aforementioned methods and systems in varied applications, they are constrained to specific use-cases primarily because of skin-color feature dependency and lack robustness under realistic conditions such as changing illumination, hand pose, and background.

In some conventional techniques, additional hardware such as depth camera and stereo camera has been explored. Other conventional techniques include data gloves based method for hand detection, camera and IR LEDs to detect hand, body-worn cameras and diffused IR illumination, and depth information for hand segmentation. Another conventional technique utilizes pipeline for real-time pose recovery of human hands from a single depth image using a CNN that can typically work with systems without resource crunch. There are many detection approaches proposed in the context of hand gesture recognition. For instance, a conventional method uses two real-time third-person hand gesture recognition systems—(i) utilizing the stereo camera hardware setup with DTW classifier and (ii) using dual-modality sensor fusion system with HMM classifier. Randomized Decision Forest classifier has also been explored for hand segmentation and hand pose estimation. Estimating 3D pose of hand in computer vision is an open research area with extensive applications in Human Robot Interaction, AR/VR. First step in Hand pose estimation typically is robust hand detection. Various conventional techniques are heavy to work on resource constrained environment.

Depth based hand detection in a conventional system employs additional hardware to solve hand localization and pose estimation. However, mobile device with depth is not very common. In another conventional system, bi-level cascade CNNs approach is utilized for hand and key point detection in egocentric view using HSV color space information. It has 11 CNN layer and takes a 4 channel input consisting of HSV color space and Laplacian edge features, and generates hand bounding box. Conventional techniques have also used AlexNet, Faster R-CNN, YOLO and Mobile-Netv2 to detect hand in FPV for gesture interpretation or hand key point detection. Although Faster RCNN, YOLOv2 and MobileNetv2 although are good enough to recognise hand in FPV, either their model size hinders real-time performance or the accuracy on a resource constrained environment like a video-see-through HMD, a smartphone.

Various embodiments of the present disclosure provided method and system for real time hand detection in FPV that are effectively utilized on resource constrained environment, and are devoid of need for additional depth or IR sensors for accurate hand detection. The disclosed system includes a lightweight and a robust hand detection module which works in real-time in a resource constrained environment or near real-time on CPU.

The disclosed system localizes and classifies hand, for instance, a hand in one go with an improved loss function that fits bounding box perfectly. The important contributions of the disclosed system and method to hand detection are: (a) low model size (36:6 MB) can be easily ported on a mobile electronic device such as a phone or HMDs with the highest precision (b) high FPS among the existing systems (c) bounding box loss function for tight fitting bounding box which results in high accuracy of hand detection.

The applications that can embody the disclosed system may include but are not limited to hand key point detection, gesture interpretation for HCI and air-writing, without compromising in accuracy or speed. The disclosed system can be utilized on HMDs. A detailed description of the above described system and method for real-time hand detection in FPV is shown with respect to illustrations represented with reference to FIGS. 1 through 7.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through 7, where similar reference characters denote corresponding features consistently throughout the figures, there are shown preferred embodiments and these embodiments are described in the context of the following exemplary system and/or method.

FIG. 1 illustrates a network environment 100 implementing a system 102 for real-time hand detection in FPV, according to an embodiment of the present subject matter. In one example embodiment, the system 102 is capable of predicting a bounding box corresponding to a hand, in particular, a dominant hand, in an image captured in FPV. For example, the dominant hand may be a hand in an image capture in the FPV. An important contribution of the disclosed embodiments is that the embodiments provides a bounding box loss function for tight fitting bounding box which results in high accuracy of hand detection. An example of a bounding box predicted around an hand, for example, a hand is shown in FIG. 2.

Figure 2:
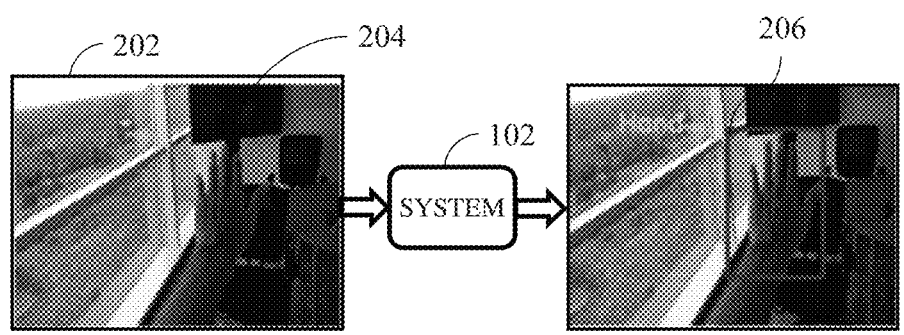
FIG. 2 illustrates an example image captured in FPV and a bounding box corresponding to an hand in the image for real-time hand detection in FPV, according to some embodiments of the present disclosure.

Referring to FIG. 2, an image 202 captured in FPV and a bounding box corresponding to an hand in the image is illustrated in accordance with an example embodiment. The image is shown to include a hand 204 which is a dominant hand in the image. Herein, it will be understood that the dominant hand refers to an hand in the image that may occupy a significant portion of the image. In an embodiment, the significant portion may be about 40-50 percent of the portion of the image. As is seen from FIG. 2, upon processing by the system 102, a bounding box for example a bounding box 206 is predicted corresponding to the hand 204. Herein, it will be noted that the embodiments have been explained by considering object as an example of hand, however the embodiments shall be equally applicable to any dominant object that occupies a significant portion in the image/frame.

Herein, the system 102 may capture the media stream, for example, images via multiple devices and/or machines 104-1, 104-2 . . . 104-N, collectively referred to as devices 104 hereinafter. Examples of the devices 104 may include, but are not limited to, a portable computer, a personal digital assistant, a handheld device, VR camera embodying devices, storage devices equipped to capture and store the images/videos, and so on. In an embodiment, the devices 104 may include devices capable of capturing the videos, for example, augmented reality (AR) based videos of hands and/or machines. The devices 104 are communicatively coupled to the system 102 through a network 106, and may be capable of transmitting the captured videos to the system 102.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The devices 104 may send the media stream to the system 102 via the network 106. The system 102 is caused to predict a tight fitting bounding box corresponding to a detected hand (which is dominant in the frame or occupies a substantial portion in the frame/image) in an image captured in FPV. In an embodiment, the system 102 may be embodied in a computing device 110. Examples of the computing device 110 may include, but are not limited to, a desktop personal computer (PC), a notebook, a laptop, a portable computer, a smart phone, a tablet, and the like. The system 102 may also be associated with a data repository 112 to store the media stream and/or images. Additionally or alternatively, the data repository 112 may be configured to store data and/or information generated during hand detection and bounding box prediction in the image. The repository 112 may be configured outside and communicably coupled to the computing device 110 embodying the system 102. Alternatively, the data repository 112 may be configured within the system 102.

In an embodiment, the system 102 includes a trained CNN network that is capable of predicting the bounding box around a dominant object such as a hand in a frame/image which occupies a significant portion of the image as it is captured in the FPV. The disclosed system 102 enables classification of the hand with improved loss function that fits bounding box perfectly, thereby resulting in high accuracy of hand detection. An example representation of the layers of the CNN network is shown and described further with reference to FIG. 3.

Figure 3:
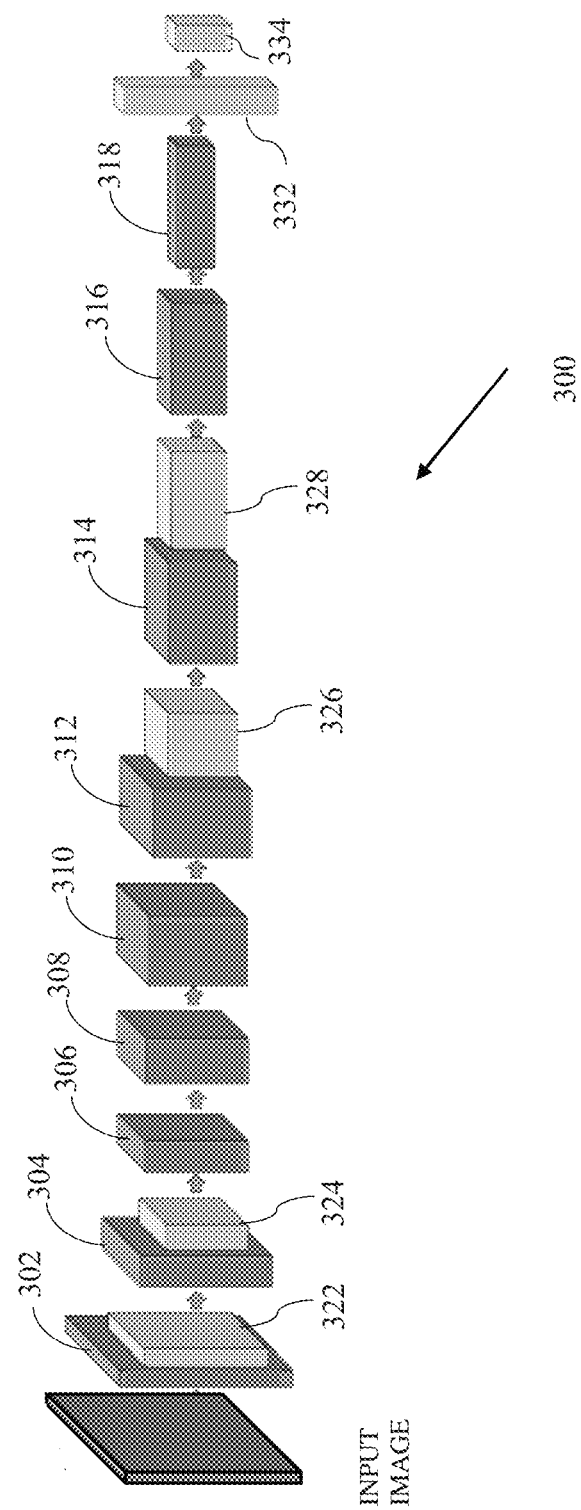
FIG. 3 illustrates an example representation of CNN network for real-time hand detection in FPV, in accordance with some embodiments of the present disclosure.

Referring to FIG. 3, an example representation of CNN network, for example a CNN network 300 is illustrated in accordance with an example embodiment.

In an embodiment, the system 102 trains the CNN network to detect hands in the images captured in FPV and predict a tight fitting bounding box around the detected hand.

As illustrated in FIG. 3, the CNN network 300 is shown to include nine convolutional layers (Conv1 302, Conv2 304, Conv3 306, Conv4 308, Conv5 310, Conv6 312, Conv7 314, Conv8 316, and Conv9 318), four pooling layers 322, 324, 326, 328 (after first, second, sixth and seventh convolutional layer) followed by two fully connected layers 332, 334. Table I below shows architecture details of the disclosed CNN network 300.

TABLE I

| Layer | Kernel Size | No. of Kernels | Activation function | Pooling and Stride |
|---|---|---|---|---|
| Conv 1 | 5 × 5 | 32 | Leaky ReLu | 2 × 2 |
| Conv 2 | 3 × 3 | 64 | Leaky ReLu | 2 × 2 |
| Conv 3 | 3 × 3 | 64 | Leaky ReLu | — |
| Conv 4 | 3 × 3 | 128 | Leaky ReLu | — |
| Conv 5 | 3 × 3 | 256 | Leaky ReLu | — |
| Conv 6 | 3 × 3 | 256 | Leaky ReLu | 2 × 2 |
| Conv 7 | 3 × 3 | 512 | Leaky ReLu | 3 × 4 |
| Conv 8 | 1 × 1 | 512 | Leaky ReLu | — |
| Conv 9 | 5 × 5 | 512 | Leaky ReLu | — |
| FC1 | — | — | — | — |
| FC2 | — | — | — | — |

In an example embodiment, the size of input image to the CNN network is maintained small so that the system 102 can detect hand in the FPV such that hand is present as the most prominent hand. Moreover, reducing the size of the input image facilitates in reducing computational complexity with the intent to make the model size small. In an example embodiment, the input image is of 160×120×3 size. In an embodiment, the system 102 utilizes leaky ReLU activation function in all eleven convolution layer to learn and make sense of most likely complicated and Non-linear complex functional mappings between the inputs and response variable.

In an embodiment the eleven layers of the CNN network includes learned layers, meaning that the CNN network is a pre-trained network. In an embodiment, the system 102 may be caused to pre-train the CNN network with a training data set comprising a plurality of training images of the scenes having the hand. An example flow-diagram illustrating method for training of the CNN network is described in detail with reference to FIG. 4.

Although the present subject matter is explained considering that the system 102 is implemented for hand detection in image captured in FPV using CNN network, it may be understood that the system 102 may is not restricted to any particular machine or environment. The system 102 can be utilized for a variety of domains where detection of a dominant hand in FPV is involved. The system 102 may be implemented in a variety of computing systems, such as a laptop computer, a desktop computer, a notebook, a workstation, a mainframe computer, a server, a network server, and the like.

Figure 4:
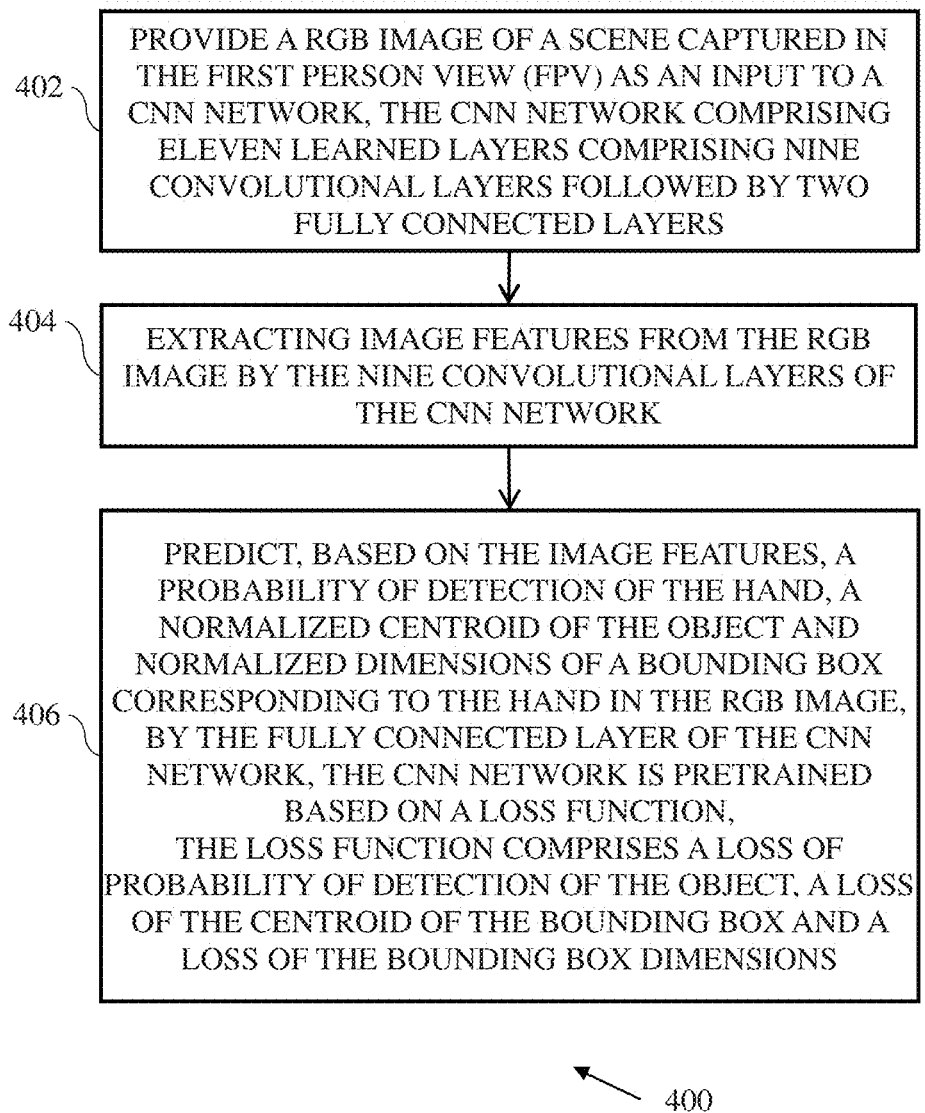
FIG. 4 is a flow diagram illustrating a method for real-time hand detection in FPV in accordance with some embodiments of the present disclosure.
Figure 7:
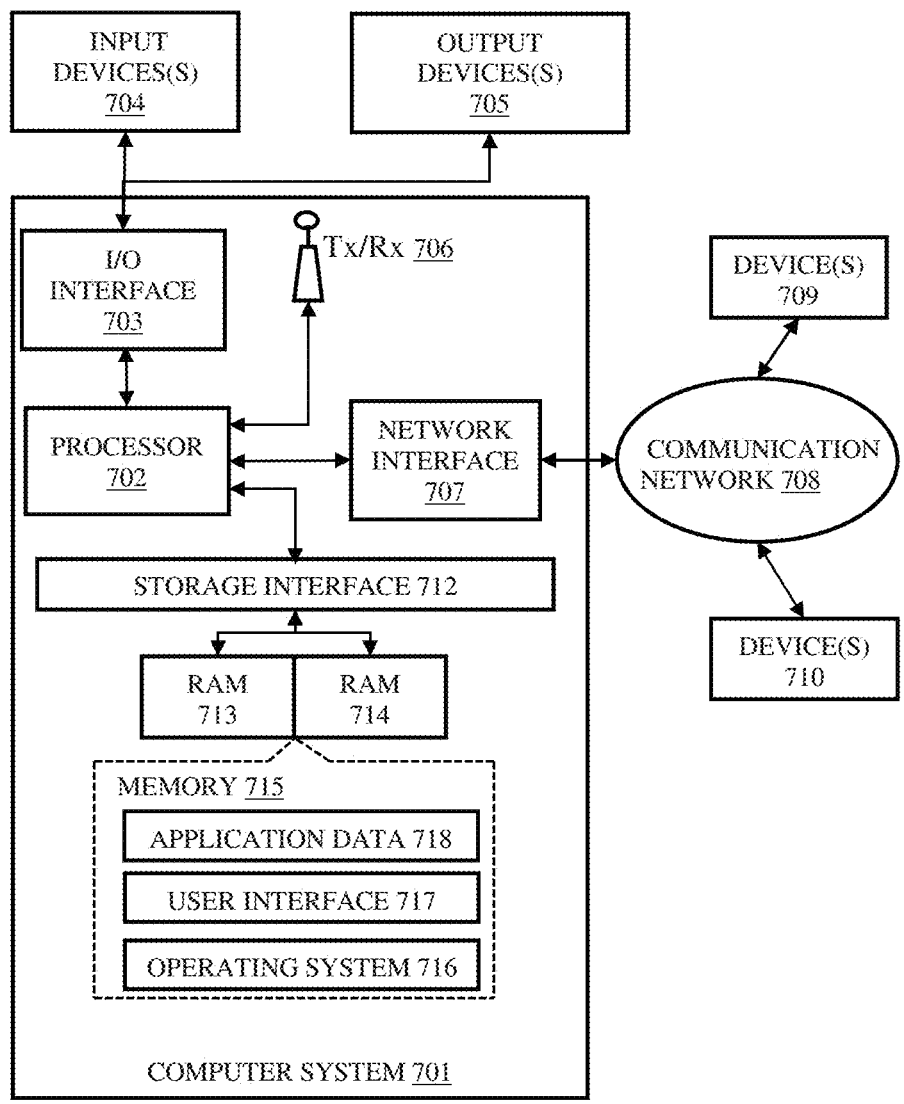
FIG. 7 illustrates a block diagram of a system for real-time hand detection in FPV in accordance with some embodiments of the present disclosure.

Referring now to FIG. 4, a flow-diagram of a method 400 for real-time hand detection in FPV is described, according to some embodiments of present disclosure. The method 400 may be described in the general context of computer executable instructions. Generally, computer executable instructions can include routines, programs, hands, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof. In an embodiment, the method 400 depicted in the flow chart may be executed by a system, for example, the system 102 of FIG. 1. In an example embodiment, the system 102 may be embodied in an exemplary computer system, for example computer system 701 (FIG. 7). The method 400 of FIG. 4 will be explained in more detail below with reference to FIGS. 1-3.

Referring to FIG. 4, in the illustrated embodiment, the method 400 is initiated at 402 where an input RGB image of a scene captured in the first person view (FPV) is provided an input to a CNN network, for example the CNN network 300 (FIG. 3). As described with reference to FIG. 3, the CNN network includes comprising eleven learned layers having nine convolutional layers followed by two fully connected layers. Herein the CNN network is pre-trained based on a loss function. In an embodiment, the CNN network is trained to output a probability of hand and normalized bounding box's centroid, and dimensions. The bounding box's dimensions includes height and width of thereof. The method for pre-training of the CNN network is explained further with reference to FIG. 5.

At 404, the method 400 includes extracting image features from the RGB image by the nine convolutional layers of the CNN network. At 406, the method 400 includes predicting, based on the image features, a probability of detection of the hand, a normalized centroid of the hand and normalized dimensions of a bounding box corresponding to the hand in the RGB image, by the fully connected layer of the CNN network. In an embodiment, the fully connected layers of the CNN network predicts the hand's confidence score, with normalized hand centroid and normalized bounding box dimensions (height and width). Herein, the bounding box coordinates are in absolute image coordinates, it is beneficial to normalize them with respect to. the RGB image. Batch normalization steer to significant enhancement in convergence and eliminate the need for any additional forms of regularization. So batch normalization is used after each convolution layer.

Figure 5:
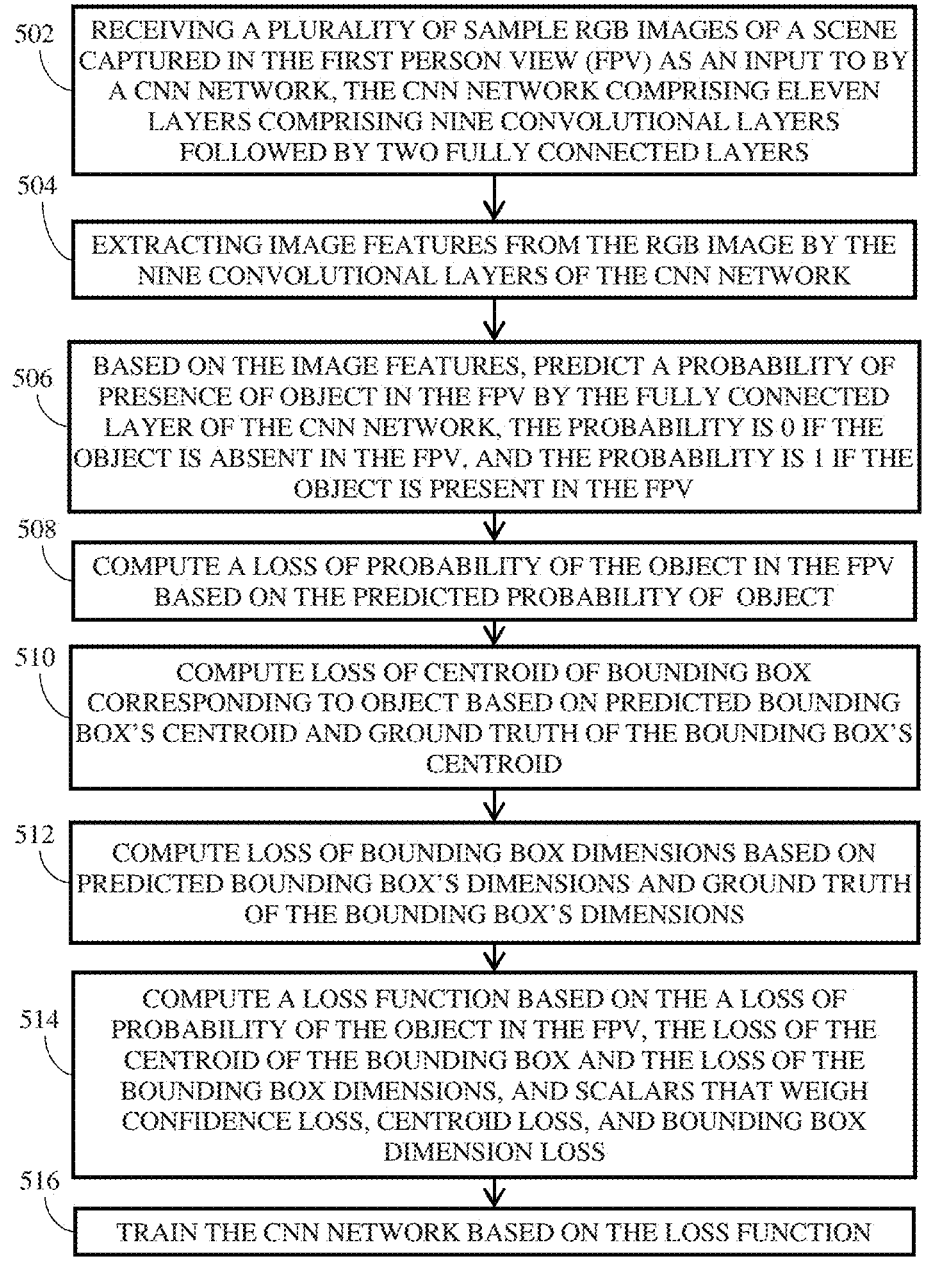
FIG. 5 is a flow diagram illustrating a method for training a CNN network for real-time hand detection in FPV in accordance with some embodiments of the present disclosure.

FIG. 5 illustrates an example flow-diagram of a method for training a CNN network, for example the CNN network 300 (FIG. 3), for hand detection in accordance with an example embodiment. The method 500 may be described in the general context of computer executable instructions. Generally, computer executable instructions can include routines, programs, hands, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, the system 102 of FIG. 1. In an example embodiment, the system 102 may be embodied in an exemplary computer system, for example computer system 701 (FIG. 7). The method 500 of FIG. 5 will be explained in more detail below with reference to FIGS. 1-3.

At 502, the method 500 includes receiving a plurality of sample RGB images of scenes captured in the first person view (FPV). In an embodiment, the size of the input images is kept small, for example, 160×120×3. Size of the input RGB images is kept small as the hands is assumed to be detected in FPV (if the hand is present) is assumed to be the most prominent hand. Moreover, inputting the images of reduced size facilitates in reducing computational complexity with the intent to make the model size small. The said RGB images are provided as an input to a CNN network, for example the CNN network 300. As described with reference to FIG. 3, the CNN network 300 includes eleven layers comprising nine convolutional layers followed by two fully connected layers.

At 504, the method 500 includes extracting image features from the RGB image by the nine convolutional layers of the CNN network 300. Based on the image features, a probability of presence of hand in the FPV is predicted by the fully connected layer of the CNN network at 506. In an embodiment, the predicted probability is 0 if the hand is absent in the FPV, and the probability is 1 if the hand is present in the FPV.

At 508, the method 500 includes computing a loss of probability of the hand in the FPV based on the predicted probability of the hand. The loss of probability of the hand in the FPV is represented by the equation (1) below as:

$$L_{confidence} = -p \log(\hat{p}) - (1-p)\log(1-\hat{p}) \quad (1)$$

where, p denotes if the hand appears in FPV, and $\hat{p}$ is predicted hand probability in FOV At 510, the method 500 includes computing a loss of centroid of bounding box corresponding to hand based on predicted bounding box's centroid and ground truth of the bounding box's centroid. The loss of centroid of the bounding box is represented by the equation (2) below as:

$$L_{centroid} = (c_x - \hat{c}_x)^2 + (c_y - \hat{c}_y)^2 \quad (2)$$

where, $(c_x; c_y)$, h, w is ground truth of hand's bounding box's centroid, height and width, respectively.

At 512, the method 500 includes computing a loss of bounding box dimensions based on predicted bounding box's dimensions and ground truth of the bounding box's dimensions. The loss of bounding box dimensions is represented by the equation (3) below as:

$$L_{boundingbox} = \left|\frac{h - \hat{h}}{h}\right| + \left|\frac{w - \hat{w}}{w}\right| \quad (3)$$

$(\hat{c}_x, \hat{c}_y)$, $\hat{h}$, $\hat{w}$ is predicted hand bounding box's centroid, height and width.

At 514, the method 500 includes computing a loss function based on the a loss of probability of the hand in the FPV, the loss of the centroid of the bounding box and the loss of the bounding box dimensions, and scalars that weigh confidence loss, centroid loss, and bounding box dimension loss. The loss function is represented by the equation (4) below:

$$L(y(\hat{c}_x, \hat{c}_y, \hat{h}, \hat{w}), y(p, c_x, c_y, h, w)) = \alpha L_{confidence} + p^* \\ (\beta L_{centroid} + \gamma L_{boundingbox}) \quad (4)$$

where, α, β, γ are scalars that weigh confidence loss, centroid loss, and bounding box dimension loss, respectively.

At 516, the method 500 includes training the CNN network based on the loss function. The trained CNN network is utilized for detecting hand in images captured in the FPV, as is described previously with reference to FIGS. 1-4.

It will be noted herein that the disclosed method enables penalizing equally for equal percentage of deviation of height and width of bounding box. The loss function enables reflection of small deviations in large boxes matter less than small deviations in small boxes because magnitude of loss should be given more weightage in small sized bounding box compared to a large sized bounding box in an hand detector. On the contrary in conventional systems and method for hand detection in FPV, SSE $((w-\hat{w})^2+(h-\hat{h})^2)$ and $(\sqrt{w}-\sqrt{\hat{w}})^2+(\sqrt{h}-\sqrt{\hat{h}})^2$ are utilized for minimizing bounding box loss. In conventional systems, sum-squared error equally weighs error's magnitude in large boxes and small boxes.

An example of experimental results to evaluate the performance of disclosed CNN network vis-à-vis conventional networks to detect an hand in FPV, for example, a hand is discussed below with reference to FIGS. 6A-6H and Table 2.

Example Scenario:

In the disclosed example scenario, experiments were conducted to detect the hand candidate in RGB input images obtained from wearable device. Experiments were conducted using various models including Faster R-CNN with a pre-trained VGG-16 model consisting of 13 shared convolutional layers and other compact models such as ZF and VGG1024 by modifying the last fully connected layer to detect hand. The results of comparison with Faster RCNN, YOLOv2, MobileNet and the disclosed CNN network 300 (FIG. 3) are discussed further with reference to Table II.

The hardware configuration used for training and testing of all the networks is as follow. An 8 core Intel® Core™ i7-6820HQ CPU, 32 GB memory and an Nvidia Quadro M5000M GPU machine for experiments. The models are trained using tensorflow r1.5, Keras v2.0.3 and Theano v0.9.0. The smartphone was interfaced with the server using a local network hosted on a Linksys EA6350 802.11ac compatible wireless router.

The dataset selected for the experiments included union of SCUT dataset, the KITTI Vision and MS COCO datasets. SCUT dataset is used to train positive samples, while KITTI Vision and MS COCO datasets are used for getting negative samples. All images were resized to 160×120 thereby reducing model size in order to detect a bounding box containing hand in a frame which occupies a significant portion of image as it is captured in FPV. Randomly 55; 551 images was selected from SCUT dataset and 17; 033 from COCO and 22; 000 from KITTI Vision dataset. Out of these images, 55; 000 were selected for training, 15; 000 for validation and 24; 584 for testing.

Input to the disclosed CNN network was normalized image obtained by dividing each channel in RGB data by 255. For tuning the network, first the disclosed CNN network was trained for centroid localization using only 18,000 images from SCUT for 16 epochs. Then using whole training set the disclosed CNN network was trained for hand classification. Finally, the disclosed CNN network was trained with complete loss function which comprises of class probability, centroid coordinates, height and width of bounding box (Refer Equation 4) with $\alpha=0.92$; $\beta=0.80$; $\gamma=0.80$ for 48 epochs. Whole training took approximately 1 day. The final layer predicted both hand class confidence score with bounding box centroid coordinates and its height and width. The output of CNN network included-(i) coordinates of bounding box's centroid and, (ii) width and height of the bounding box. These outputs were in normalized image coordinate space so that they lie between 0 and 1. The disclosed CNN network was trained with the SGD with momentum optimizer using a learning rate of $10^{-3}$ and momentum of 0:9.

Table II reports mean Average Precision (mAP) and frame rate for detection on machine discussed in Section IV-A.

good mean Absolute Precision (mAP) and it even works well at high IoU compared to other hand detector used in literature.

FIGS. 6A-6H illustrate results of the state-of-the art detectors mentioned in Table II in different conditions such as poor illumination, blur, indoor and outdoor environments. It was noticed that the disclosed CNN network's bounding box fit perfectly with good consistency in different lighting condition. Even though other detectors are unlikely to predict false positives in the background, YOLOv2 makes more localization errors. The disclosed CNN network is much better compared to other methods and in particular suitable candidate for FPV and at the very high framerate of 231 fps. Hence the disclosed CNN network may be used as initial stage for all algorithms for air-writing, hand key-point detection and hand gesture recognition given its capability to run on real-time on low computational device. On (Intel CORE i7) CPU it achieve 16 fps. It is faster as well as accurate compared to other methods even at higher IoU.

FIG. 7 is a block diagram of an exemplary computer system 701 for implementing embodiments consistent with the present disclosure. The computer system 701 may be implemented in alone or in combination of components of the system 102 (FIG. 1). Variations of computer system 701 may be used for implementing the devices included in this disclosure. Computer system 701 may comprise a central processing unit ("CPU" or "hardware processor") 702. The hardware processor 702 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™ Xeon™, Celeron™ or other line of processors, etc. The processor 702 may be

TABLE II

| Model | mAP (IoU = 0.5) | mAP (IoU = 0.6) | mAP (IoU = 0.7) | Rate (FPS) | Size (MB) | On Device |
|---|---|---|---|---|---|---|
| Faster R-CNN VGG16 | 98.1 | 95.2 | 86.9 | 3.9 | 546 | X |
| Faster R-CNN VGG1024 | 96.8 | 94.7 | 86.7 | 10.4 | 349.7 | X |
| Faster R-CNN ZF | 97.3 | 95.0 | 89.2 | 12.5 | 235 | X |
| YOLOv2 | 98.9 | 96.1 | 84.2 | 14.7 | 203.9 | X |
| MobileNet | 69.1 | 62.8 | 57.3 | 18.2 | 40 | ✓ |
| Disclosed CNN Network | 99.88 | 99.87 | 99.82 | 231 | 36.6 | ✓ |

It is observed that the disclosed CNN network is much faster and robust compared to YOLOv2, MobileNet and Faster R-CNN with any of the pre-trained models. At an Intersection over Union (IoU) of 0:5, the disclosed CNN network achieves 99:88 mAP with F1 score of 0:96 whereas Faster R-CNN with VGG-16 achieves 98:1 mAP, Faster R-CNN with VGG1024 achieves 96:8 mAP, Faster R-CNN with ZF achieves 97:3 mAP and YOLOv2 achieves 98:9 mAP. However, it was observed that other network performs poorly when compared to disclosed CNN network in localizing the hand candidate at higher IoU that is required for further air-writing, hand key point detection or gesture interpretation. The disclosed CNN network works well with implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 508, the computer system 701 may communicate with devices 709 and 710. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 716, user interface application 717, user/application data 718 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 701 may store user/application data 718, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclose method and system for hand detection in images captured in FPV. The disclosed system includes a CNN network that is trained on a loss function which is a combination of confidence score, dimension loss and centroid loss. The CNN network outputs a probability of presence of hand in the image and a dimensions and centroid of a tight-fitting bounding box corresponding to the hand. The bounding box detection performance is boosted by taking into account small deviations in large boxes matter less than small deviations in small boxes by penalizing in proportion. The disclosed lightweight model is designed to work on resource constrained environment such as the smartphones and head mounts. The disclosed CNN network precludes the need of any additional depth or IR sensors for accurate hand detection. It was demonstrated that the disclosed CNN network outperformed state-of-art in FPV using RGB images at both in terms of accuracy exhibiting mean average precision (mAP) of 99:88%, F1 score of 0:96 and with a very high frame rate of 231 FPS.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for real-time hand detection in a first person view (FPV), the method comprising:
receiving a RGB image of a scene captured in the FPV as an input by a Convolutional Neural Network (CNN), via one or more hardware processors, the CNN comprising eleven learned layers having nine convolutional layers followed by two fully connected layers;
extracting image features from the RGB image by the nine convolutional layers of the CNN network, via the one or more hardware processors; and
predicting, based on the image features, a probability of detection of the hand, a normalized centroid of the hand and normalized dimensions of a bounding box corresponding to the hand in the RGB image, via the one or more hardware processors, by the fully connected layer of the CNN network,
wherein the CNN network is pre-trained based on a loss function, and
wherein, the loss function is indicative of level of training of the CNN network, and
wherein the loss function comprises a loss of probability of detection of the hand, a loss of the centroid of the bounding box and a loss of the bounding box dimensions.

2. The processor implemented method of claim 1, wherein the bounding box dimensions includes height and weight of the bounding box, the bounding box coordinates being in normalized image coordinates.

3. The processor implemented method of claim 1, further comprising normalizing the centroid and dimensions of the bounding box in normalized image coordinates of the RGB image.

4. The processor implemented method of claim 1, wherein each convolution layer of the nine convolution layers of the CNN network utilizes leaky ReLU activation function.

5. The processor implemented method of claim 1, wherein the CNN network further comprises four max pooling layers placed after first, second, sixth and seventh convolutional layer of the nine convolution layers, wherein the four max pooling layers facilitates in detecting best image features of the RGB image.

6. The processor implemented method of claim 1, further comprising training the CNN network based on a plurality of training RGB images of the hand.

7. The processor implemented method of claim 1, wherein the loss-function represented by the equation:

$$L(\hat{y}(\hat{c}_x, \hat{c}_y, \hat{h}, \hat{w}), y(p, c_x, c_y, h, w)) = \alpha L_{confidence} + p*(\beta L_{centroid} + \gamma L_{boundingbox})$$

where, $$L_{confidence} = -p\log(\hat{p}) - (1-p)\log(1-\hat{p})$$

$$L_{centroid} = (c_x - \hat{c}_x)^2 + (c_y - \hat{c}_y)^2$$

$$L_{boundingbox} = \left|\frac{h - \hat{h}}{h}\right| + \left|\frac{w - \hat{w}}{w}\right|$$

where, p is the probability of hand in the FPV, the probability is 0 if the hand is absent in the FPV, and the probability is 1 if the hand is present in the FPV, (Cx, Cy), h, w is ground truth of the bounding box's centroid, height and width, respectively, $\hat{p}$ is the predicted probability in the field of view, ($\hat{c}_x$, $\hat{c}_y$), $\hat{h}$, $\hat{w}$ is the predicted bounding box's centroid, height and width, α, β, γ are scalars that weigh confidence loss, centroid loss, and bounding box dimension loss respectively.

8. A system (701), comprising:
a memory (715) storing instructions;
one or more communication interfaces (707); and
one or more hardware processors (702) coupled to the memory (715) via the one or more communication interfaces (707), wherein the one or more hardware processors (702) are configured by the instructions to:

receive a RGB image of a scene captured in the first person view (FPV) as an input by a CNN network, the CNN network comprising eleven learned layers comprising nine convolutional layers followed by two fully connected layers;

extract image features from the RGB image by the nine convolutional layers of the CNN network; and predict, based on the image features, a probability of detection of the hand, a normalized centroid of the hand and normalized dimensions of a bounding box corresponding to the hand in the RGB image, by the fully connected layer of the CNN network, wherein the CNN network is pre-trained based on a loss function, and wherein the loss function is indicative of level of training of the CNN network, wherein the loss function comprises a loss of probability of detection of the hand, a loss of the centroid of the bounding box and a loss of the bounding box dimensions.

9. The system of claim 8, wherein the bounding box dimensions includes height and weight of the bounding box, the bounding box coordinates being in normalized image coordinates.

10. The system of claim 8, wherein the one or more hardware processors are further configured by the instructions to normalize the centroid and dimensions of the bounding box in normalized image coordinates of the RGB image.

11. The system of claim 8, wherein each convolution layer of the nine convolution layers of the CNN network utilizes leaky ReLU activation function.

12. The system of claim 8, wherein the CNN network further comprises four max pooling layers placed after first, second, sixth and seventh convolutional layer of the nine convolution layers, wherein the four max pooling layers facilitates in detecting the best image features of the RGB image.

13. The system of claim 8, wherein the one or more hardware processors are further configured by the instructions to train the CNN network based on a plurality of training RGB images of the hand.

14. The system of claim 8, wherein the loss-function represented by the equation:

$$L(\hat{y}(\hat{c}_x, \hat{c}_y, \hat{h}, \hat{w}), y(p, c_x, c_y, h, w)) = \alpha L_{confidence} + p*(\beta L_{centroid} + \gamma L_{boundingbox})$$

where, $$L_{confidence} = -p\log(\hat{p}) - (1-p)\log(1-\hat{p})$$

$$L_{centroid} = (c_x - \hat{c}_x)^2 + (c_y - \hat{c}_y)^2$$

$$L_{boundingbox} = \left|\frac{h - \hat{h}}{h}\right| + \left|\frac{w - \hat{w}}{w}\right|$$

where, p is the probability of hand in the FPV, the probability is 0 if the hand is absent in the FPV, and the probability is 1 if the hand is present in the FPV, (Cx, Cy), h, w is ground truth of the bounding box's centroid, height and width, respectively, $\hat{p}$ is the predicted probability in the field of view, ($\hat{c}$x, $\hat{c}$y), $\hat{h}$, $\hat{w}$ is the predicted bounding box's centroid, height and width, α, β, γ are scalars that weigh confidence loss, centroid loss, and bounding box dimension loss respectively.

15. One or more non-transitory machine readable information storage mediums comprising one or more instructions which when executed by one or more hardware processors cause:

receiving a RGB image of a scene captured in the FPV as an input by a Convolutional Neural Network (CNN), via one or more hardware processors, the CNN comprising eleven learned layers having nine convolutional layers followed by two fully connected layers;

extracting image features from the RGB image by the nine convolutional layers of the CNN network, via the one or more hardware processors; and predicting, based on the image features, a probability of detection of the hand, a normalized centroid of the hand and normalized dimensions of a bounding box corresponding to the hand in the RGB image, via the one or more hardware processors, by the fully connected layer of the CNN network, wherein the CNN network is pre-trained based on a loss function, and wherein, the loss function is indicative of level of training of the CNN network, and wherein the loss function comprises a loss of probability of detection of the hand, a loss of the centroid of the bounding box and a loss of the bounding box dimensions.

* * * * *